United States Patent
Sapir

(10) Patent No.: US 8,801,009 B2
(45) Date of Patent: Aug. 12, 2014

(54) FOLDING WHEEL MECHANISM FOR VEHICLE

(76) Inventor: Riccardo Nimrod Sapir, Avihail (IL)

(*) Notice: Subject to any disclaimer, the term of this patent is extended or adjusted under 35 U.S.C. 154(b) by 65 days.

(21) Appl. No.: 13/375,733

(22) PCT Filed: May 30, 2010

(86) PCT No.: PCT/IL2010/000426
§ 371 (c)(1),
(2), (4) Date: Jan. 10, 2012

(87) PCT Pub. No.: WO2010/140143
PCT Pub. Date: Dec. 9, 2010

(65) Prior Publication Data
US 2012/0104714 A1    May 3, 2012

Related U.S. Application Data

(60) Provisional application No. 61/217,685, filed on Jun. 2, 2009.

(51) Int. Cl.
*B62K 15/00*     (2006.01)
(52) U.S. Cl.
CPC ................. *B62K 15/008* (2013.01)
USPC ....................................... 280/87.05
(58) Field of Classification Search
CPC ......... B62K 3/002; B62K 15/008; B62K 9/00
USPC ....................................... 280/87.05
See application file for complete search history.

(56) References Cited

U.S. PATENT DOCUMENTS

| | | | |
|---|---|---|---|
| 5,183,129 | A | 2/1993 | Powell |
| 6,012,539 | A | 1/2000 | Patmont |

(Continued)

FOREIGN PATENT DOCUMENTS

| | | |
|---|---|---|
| CN | 2706392 | 6/2005 |
| DE | 9213474 U1 | 2/1993 |

(Continued)

OTHER PUBLICATIONS

An International Preliminary Report on Patentability dated Sep. 30, 2010 which issued during the prosecution of Applicant's PCT/IL2010/000426.

(Continued)

*Primary Examiner* — J. Allen Shriver, II
*Assistant Examiner* — Brian Cassidy
(74) *Attorney, Agent, or Firm* — Law Offices of Steven W. Weinrieb

(57) ABSTRACT

A portable foldable scooter (20) having a front portion (24) and a back portion (26) includes a footboard (22) having an upper face (54), a lower face (56), a front end (50) at the front portion of the scooter, and a back end (52) at the back portion of the scooter. A steering bar (28) having an upper end and a lower end is coupled to the front end (50) of the footboard (22). A handle bar (30) is coupled to the upper end of the steering bar (28). A front wheel (32) is coupled to the front portion (24) of the scooter (22). A back wheel (34) has a central longitudinal axis (43) around which the back wheel (34) rotates during riding of the scooter (20). A first back hinge (44) couples the back wheel (34) to the back end (52) of the footboard (22) and allows rotation of the back wheel (34) around an axis (45) that is not parallel to the central longitudinal axis. Other embodiments are also described.

20 Claims, 21 Drawing Sheets

(56) References Cited

U.S. PATENT DOCUMENTS

| | | |
|---|---|---|
| 6,460,866 B1 | 10/2002 | Altschul et al. |
| 6,616,154 B1 | 9/2003 | Neuhold |
| 7,040,443 B1 | 5/2006 | Roth et al. |
| 7,100,929 B2 | 9/2006 | Shapiro et al. |
| 2002/0029918 A1* | 3/2002 | Patmont et al. ............... 180/220 |
| 2002/0088834 A1 | 7/2002 | Wolfgram |
| 2002/0093161 A1 | 7/2002 | Udwin et al. |
| 2002/0104863 A1 | 8/2002 | Jones et al. |
| 2002/0170763 A1* | 11/2002 | Townsend ..................... 180/220 |
| 2003/0001351 A1 | 1/2003 | Schauble et al. |
| 2003/0015976 A1* | 1/2003 | Chen .................................. 318/9 |
| 2003/0085539 A1 | 5/2003 | Cochimin |
| 2012/0018968 A1* | 1/2012 | Joslin et al. ............. 280/87.041 |

FOREIGN PATENT DOCUMENTS

| | | |
|---|---|---|
| DE | 29723276 U1 | 12/1998 |
| DE | 29815162 U1 | 1/1999 |
| DE | 10038261 | 2/2002 |
| DE | 10045821 | 3/2002 |
| EP | 0362033 | 4/1990 |
| FR | 2478569 A1 | 9/1981 |
| FR | 2915454 | 10/2008 |
| GB | 2279921 | 1/1995 |
| WO | 01/05646 | 1/2001 |
| WO | 02/12057 | 2/2002 |
| WO | 03/093093 | 11/2003 |
| WO | 2007/128124 | 11/2007 |
| WO | 2008/090309 | 7/2008 |
| WO | 2010/140143 | 12/2010 |
| WO | 2010/140143 A1 | 12/2010 |

OTHER PUBLICATIONS

An International Search Report dated Sep. 30, 2010 which issued during the prosecution of Applicant's PCT/IL/00426.

A Written Opinion dated Sep. 30, 2010 which issued during the prosecution of Applicant's PCT/IL/00426.

* cited by examiner

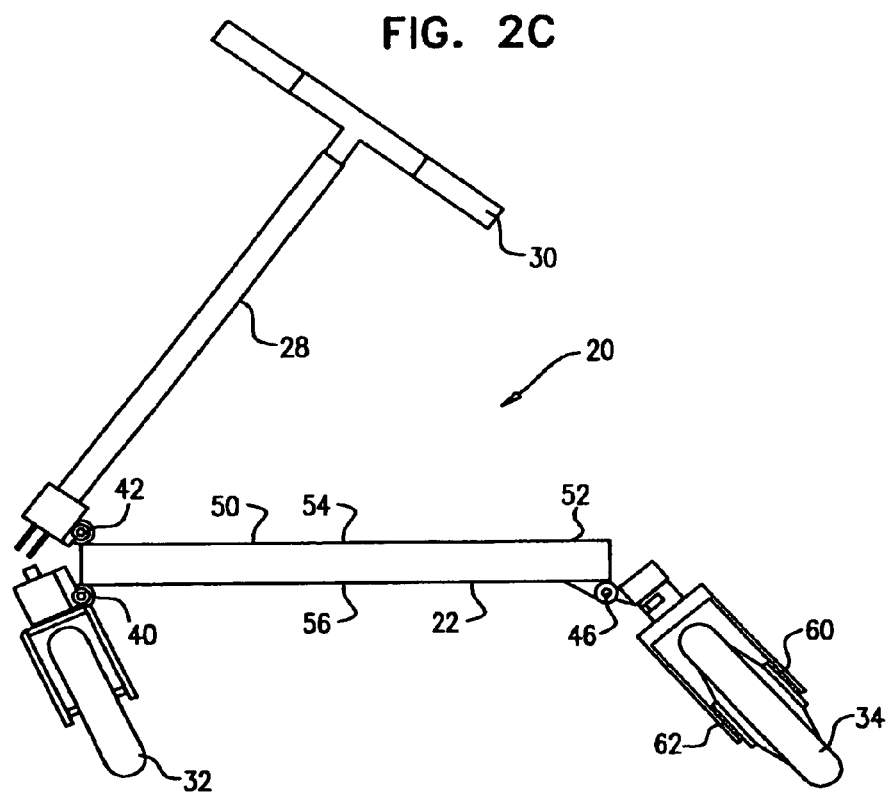

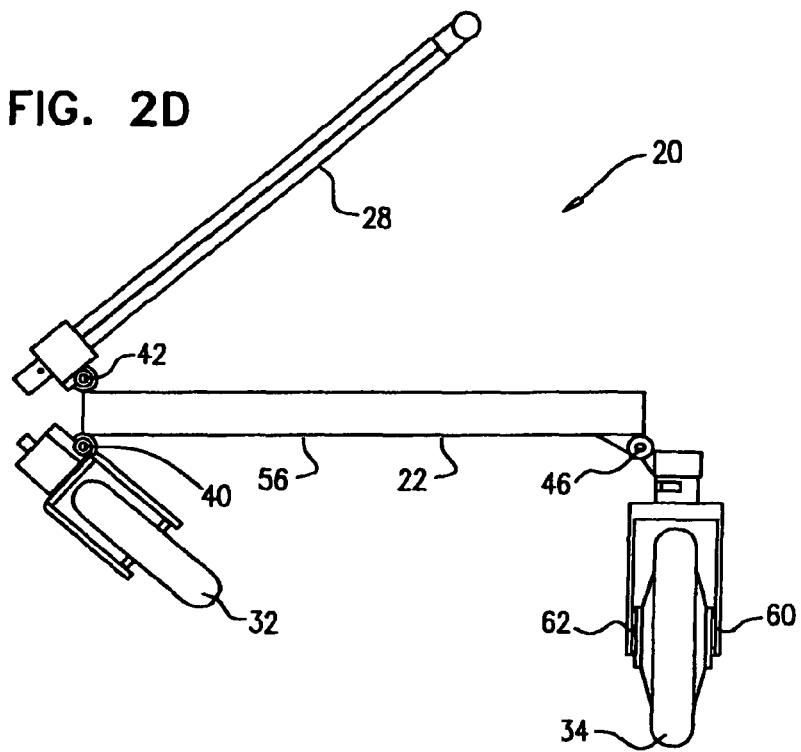
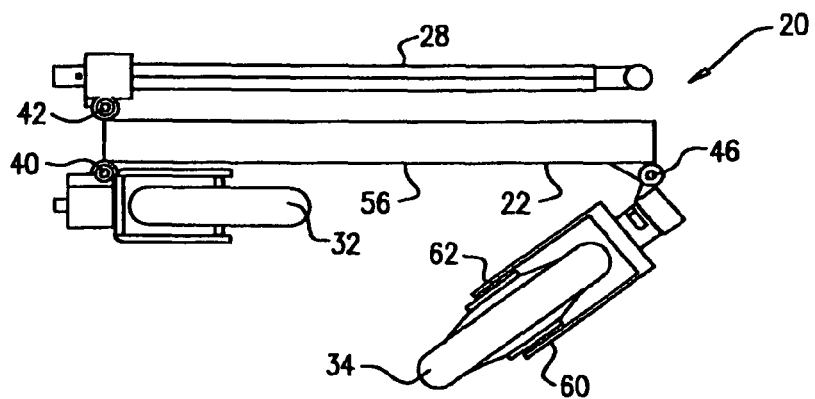

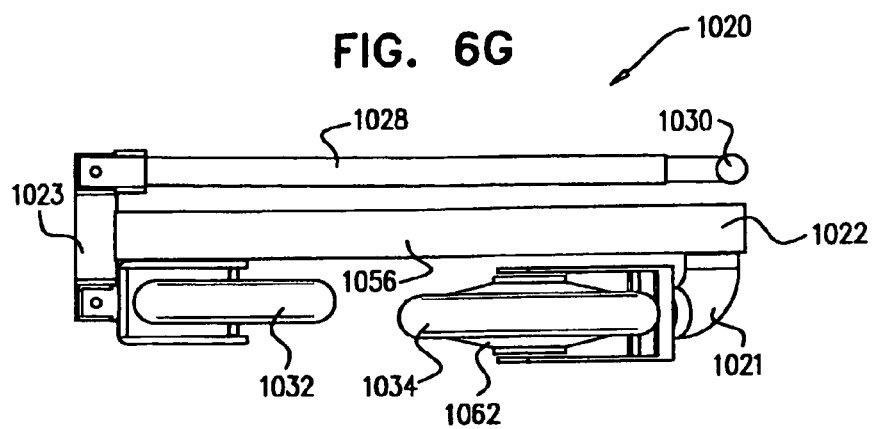
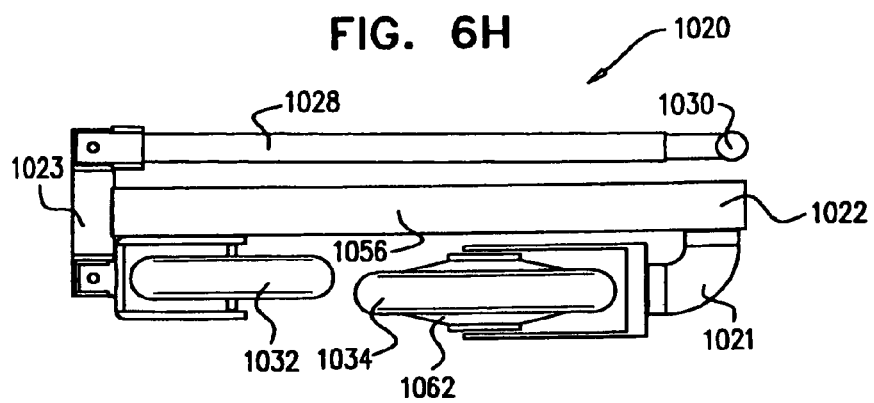

FOLDING WHEEL MECHANISM FOR VEHICLE

CROSS-REFERENCES TO RELATED APPLICATIONS

The present application claims the priority of:

U.S. Provisional Patent Application 61/217,685 to Sapir, filed Jun. 2, 2009, entitled, "Folding wheel mechanism for vehicle"

The above application is incorporated herein by reference.

FIELD OF THE APPLICATION

Embodiments of the present invention relate generally to vehicles, and particularly to a folding wheel mechanism for a vehicle such as a scooter.

BACKGROUND OF THE APPLICATION

Scooters are a popular form of personal transport. Some scooters have a collapsible structure allowing them to be folded into a compact state.

U.S. Pat. No. 6,616,154 to Neuhold describes a foldable kick scooter comprising a footboard which forms bearing forks for wheels and on which is held a guide bearing for the bearing forks of the front wheel, which is connected to a steering column which is divided into linked elements and can be swiveled about a transversal axle against the footboard. In order to provide advantageous construction conditions it is proposed that both the guide bearing for the front bearing fork as well as the rear bearing fork are held downwardly swivelable about parallel transversal axles towards the footboard and that the footboard forms two through-openings for the swiveled wheels.

U.S. Pat. No. 5,183,129 to Powell describes a collapsible scooter, described as improved and highly portable, having a front frame extending upwardly from a front portion of a lower frame and being pivotally secured thereto. The front frame is secured at its upper end to steering means, and a front wheel is rotatably secured to the steering means. A rear wheel is rotatably secured to a rear portion of the lower frame, and a platform for supporting a rider is secured to the lower frame between the front and rear wheels. Lock means releasably lock the front frame and lower frame in an operating position or in a collapsed position in which the front frame extends rearwardly from the front portion of the lower frame. An engine is preferably coupled with the rear wheel of the scooter using a belt drive system which preferably includes toothed pulleys and a notched drive belt.

PCT Publication WO 2007-128124 to Atherton et al. describes a scooter having a platform on which a rider can stand, a front wheel attached to a steering system including an upstanding handle bar and rear wheel which is driven. The scooter can be folded at a hinge line across the platform so as to allow it to collapse. A case for the scooter includes a front part and a rear part covering the front and rear wheels with the parts brought together by the collapsing of the platform. This folding action also uses a pivot link to move the front and rear wheels pivoted within the respective case parts to a folded position. The steering includes a headstock with the steering bar connected to the front fork by a drive coupling which converts the rotation of the steering bar about the generally vertical axis to the rotation of the fork about an inclined axis.

The following patents and patent applications may be of interest:
CN 2706392Y
DE 10038261
DE 10045821
DE 29723276
DE 298151620
DE 9213474U
EP 0362033
FR 2478569
FR 2915454
GB 2279921
WO 2001-05646
WO 2002-12057
WO 2003-093093
WO 2008-090309
US 2002-0088834
US 2002-0093161
US 2002-0104863
US 2003-0001351
US 2003-0085539

SUMMARY OF APPLICATIONS

In some applications of the present invention, a foldable scooter is provided having one or more hinges that connect different elements of the scooter and facilitate rotation of these different elements in order to fold the scooter into a compact state. In its folded compact state, the scooter assumes a smaller dimension than in its unfolded operative state and thus in its folded state, the scooter is typically easily portable or insertable into a carrier bag. The scooter comprises a footboard upon which a user stands (or rests his or her feet in the case of a scooter with a seat). The scooter further comprises a front wheel coupled to a front portion of the scooter and a back wheel coupled to a back portion of the scooter. The back wheel has a central longitudinal axis around which the back wheel rotates when the user rides the scooter. The back wheel is coupled to the back end of the footboard by a first back hinge which, during folding of the scooter, facilitates rotation of the back wheel around an axis that is not parallel (e.g., that is perpendicular) to the central longitudinal axis of the back wheel. Rotation of the back wheel around this not-parallel axis causes the left and right faces of the back wheel to be generally coplanar with the upper and lower faces of the footboard.

Typically, the scooter additionally comprises a second back hinge, which couples the back wheel to the back end of the footboard. Once the wheel has been rotated by the first hinge, the second back hinge facilitates further rotation of the back wheel, around a different axis, to a position in which a face of the back wheel faces one of the faces of the footboard. Typically, this different axis is parallel to the central longitudinal axis of the back wheel when the scooter is in its unfolded operative state.

In some applications, the scooter further comprises a first front hinge that couples the front wheel to the front end of the footboard. During folding of the scooter, the front wheel may be turned 90 degrees to the left or right using the normal steering functionality of the scooter, and then the front hinge facilitates rotation of the front wheel to a position in which a face of the front wheel faces one of the faces of the footboard.

The scooter typically comprises a steering bar that is coupled to the front end of the footboard and allows the user to steer the scooter. Typically, the steering bar is coupled to the footboard via a second front hinge. During the transition of the scooter to the folded state, the steering bar is made to rotate around the second front hinge, to a position in which it lies parallel to the footboard. When the scooter is being unfolded, the steering bar typically clicks into place or is otherwise secured via a locking mechanism that couples the steering bar to the front wheel. Typically, the steering bar is telescopically collapsible. Once the steering bar lies parallel to the footboard, when the scooter is in the folded state, it can be made to telescopically collapse to a length that is generally similar to the length of the footboard. (Alternatively, the steering bar may be made to telescopically collapse prior to being parallel to the footboard.)

In some applications, the scooter comprises an electric scooter that comprises a hub motor located in the back wheel of the scooter. In such an application, the footboard typically holds batteries to power the electric motor and driving circuitry which transmits the power to the hub motor. It is noted that use of a hub motor in the back wheel (rather than a chain drive or belt for power transmission system based on a footboard-mounted motor) facilitates the folding of the rear wheel into the collapsed state, as described hereinabove.

There is therefore provided, in accordance with some applications of the present invention, a portable foldable scooter having a front portion and a back portion, the scooter including:
- a footboard having an upper face, a lower face, a front end at the front portion of the scooter, and a back end at the back portion of the scooter;
- a steering bar having an upper end and a lower end, the steering bar coupled to the front end of the footboard;
- a handle bar coupled to the upper end of the steering bar;
- a front wheel coupled to the front portion of the scooter;
- a back wheel having a central longitudinal axis around which the back wheel rotates during riding of the scooter; and
- a first back hinge coupling the back wheel to the back end of the footboard and allowing rotation of the back wheel around an axis that is not parallel to the central longitudinal axis.

In some applications, the first back hinge allows rotation of the back wheel around an axis that is perpendicular to the central longitudinal axis.

In some applications, the back wheel includes a hub motor.

In some applications, the scooter further includes a second back hinge coupling the back wheel to the back end of the footboard and allowing rotation of the back wheel to a position in which a face of the back wheel faces one of the faces of the footboard.

In some applications, the scooter further includes at least one front hinge coupling the front wheel to the front end of the footboard, and allowing rotation of the front wheel to a position in which a face of the front wheel faces one of the faces of the footboard.

In some applications, the back hinge includes a locking mechanism.

There is further provided, in accordance with some applications of the present invention, a portable foldable scooter having a front portion and a back portion, the scooter including:
- a footboard having an upper face, a lower face, a front end at the front portion of the scooter, and a back end at the back portion of the scooter;
- a front wheel coupled to the front portion of the scooter; and
- a back wheel coupled to the back portion of the scooter, wherein, in a folded state of the scooter, a face of the back wheel faces one of the faces of the footboard.

In some applications, in the folded state of the scooter, a face of the front wheel faces one of the faces of the footboard The present invention will be more fully understood from the following detailed description of embodiments thereof, taken together with the drawings, in which:

BRIEF DESCRIPTION OF THE DRAWINGS

FIGS. 2A-G are schematic illustrations of the transition of the scooter from an unfolded, operative state into a folded state, in accordance with some applications of the present invention;

FIGS. 6A-I are schematic illustrations of the transition of the scooter from an unfolded, operative state into a folded state, in accordance with some applications of the present invention.

DETAILED DESCRIPTION OF THE APPLICATIONS

Figure 1:
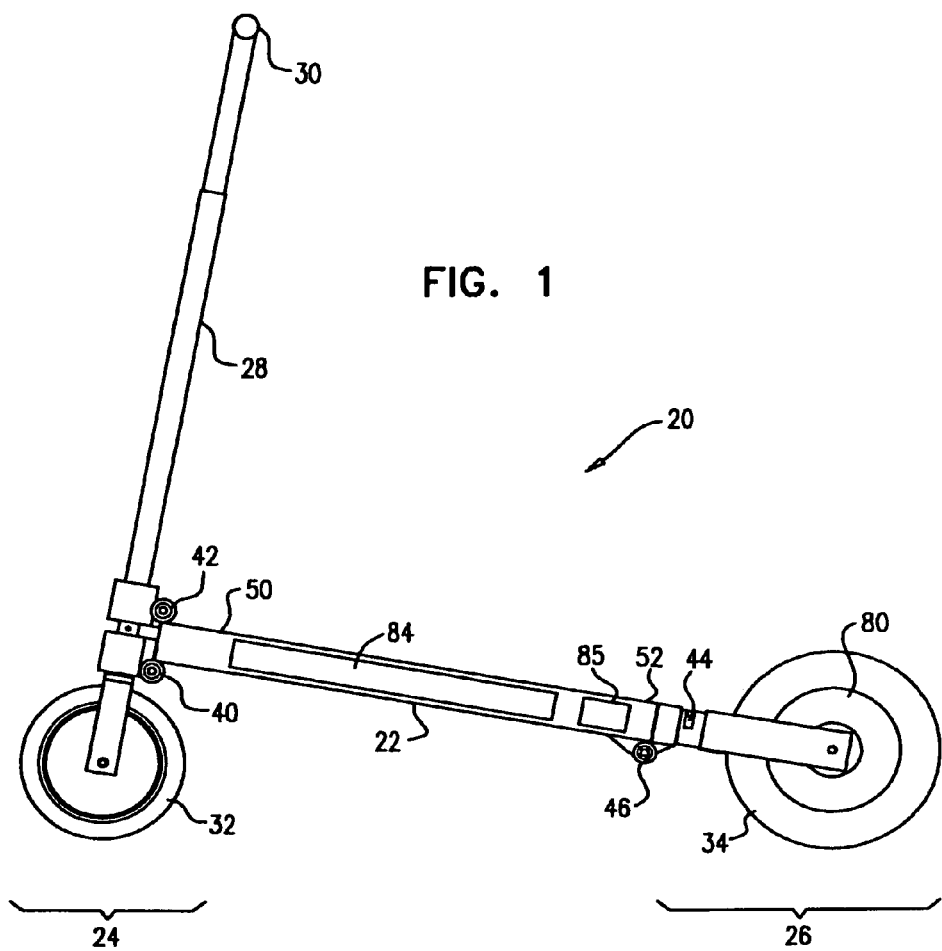
FIG. 1 is a schematic illustration of a scooter in an operative unfolded state, in accordance with some applications of the present invention.

FIG. 1 is a schematic illustration of a scooter 20 in an operative unfolded state, in accordance with some applications of the present invention. Scooter 20 comprises a footboard 22 upon which a user stands. Footboard 22 connects a front portion 24 of the scooter with a back portion 26 of the scooter. Front portion 24 of scooter 20 comprises a steering bar 28, a handle bar 30, a front wheel 32 and typically at least two front hinges. A first front hinge 40 couples a hub of front wheel 32 to the front end 50 of footboard 22 (coupling may be by means of one or more intermediate elements). A second front hinge 42 couples a lower end of steering bar 28 to a front end 50 of footboard 22.

The back portion 26 of scooter 20 comprises a back wheel 34 and typically at least two back hinges. A first back hinge 44 couples a back end 52 of footboard 22 with a hub of the back wheel 34. First back hinge 44 typically comprises a releasable locking mechanism in order to secure back wheel 34 in place when the scooter is in an unfolded, operative state. A second back hinge 46 couples the hub of back wheel 34 to the back end 52 of footboard 22.

Although not shown in the figures, some applications of the present invention include the use of more than two wheels that fold, e.g., three, four, or more wheels that fold.

Figure 2A:
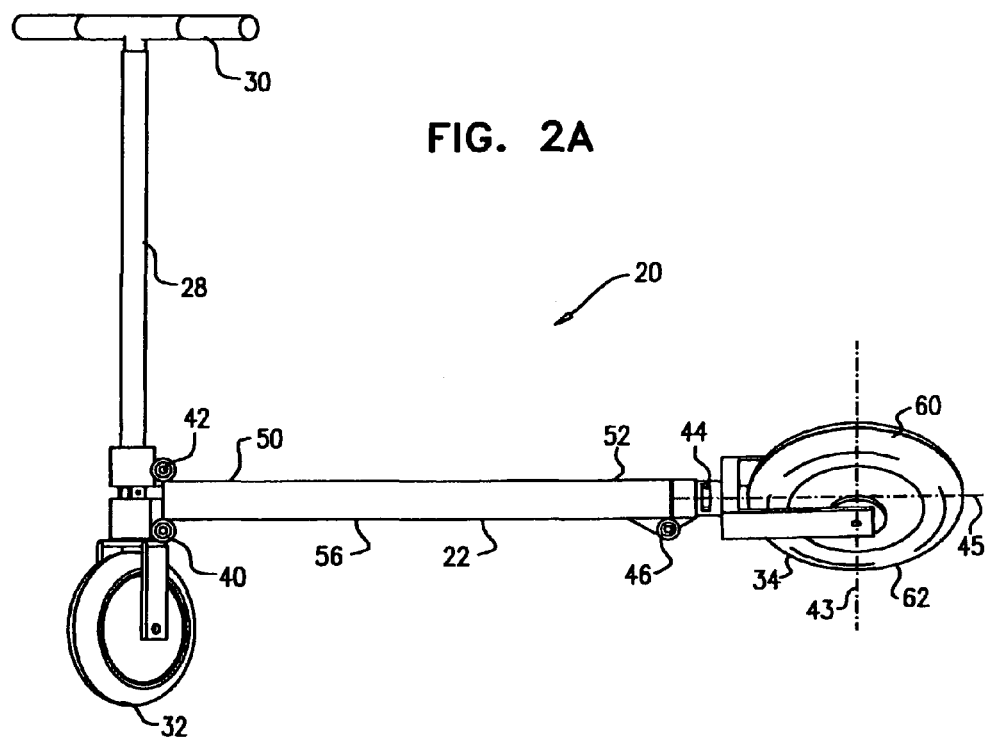
Figure 2B:
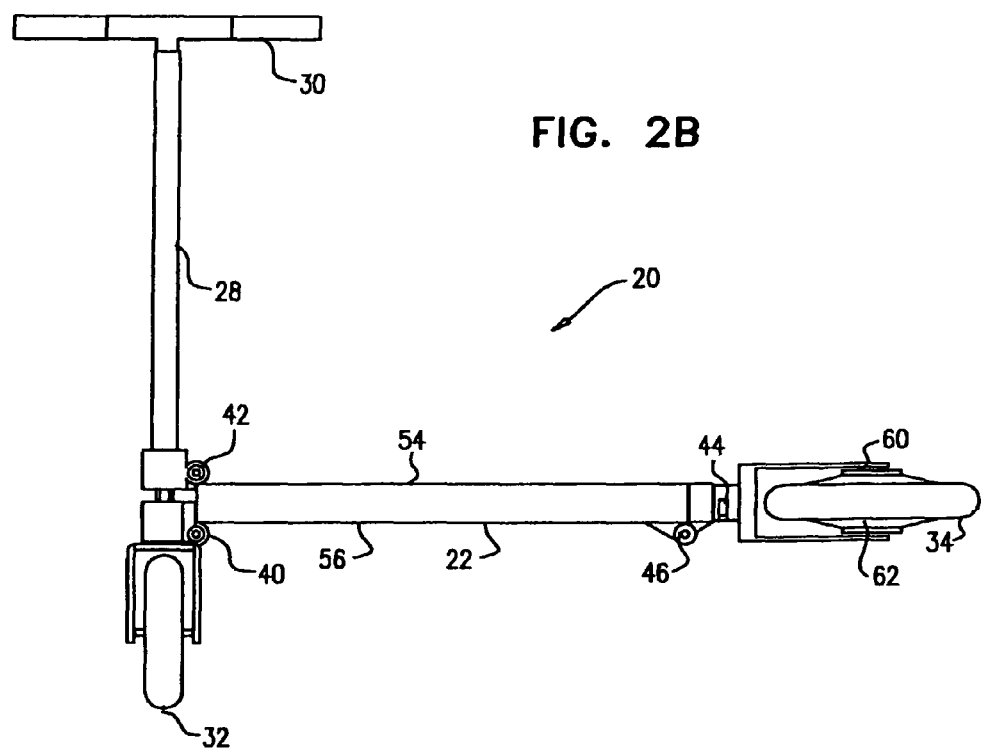

FIGS. 2A-G are schematic illustrations of the transition of scooter 20 from an unfolded, operative state into a folded state, in accordance with some applications of the present invention. As described hereinabove, the hub of back wheel 34 is coupled to back end 52 of footboard 22 via first back hinge 44. Back wheel 34 has a central longitudinal axis 43 around which the back wheel rotates when the user rides the scooter. During folding of the scooter, the locking mechanism of hinge 44 is released. Once in an unlocked state, hinge 44 facilitates rotation of the back wheel around an axis 45 that is perpendicular (or otherwise not parallel) to the central longitudinal axis of the back wheel. FIG. 2A shows scooter 20 after the locking mechanism of hinge 44 has been released and the back wheel has begun to rotate around axis 45. Rotation of the back wheel around axis 45 causes a left face 62 and a right face 60 of back wheel 34 to be generally coplanar with an upper face 54 and a lower face 56 of footboard 22, as shown in FIG. 2B.

Typically, scooter 20 additionally comprises a second back hinge 46, which couples the hub of back wheel 34 to back end 52 of footboard 22. Once back wheel 34 has been rotated by first hinge 44, the second back hinge 46 facilitates further rotation of the back wheel, around a different axis, as shown in FIGS. 2C-E and 2G. Typically, this different axis 47 is parallel to central longitudinal axis 43 of the back wheel when scooter 20 is in its unfolded operative state. Rotation of wheel 34 around axis 47 continues until the wheel reaches a position in which a face of the back wheel (e.g. a left face 62 of wheel 34), faces one of the faces of the footboard (e.g., lower face 56) as shown in FIG. 2F.

For clarity, FIGS. 2A-F show rotation of back wheel 34 around axis 45 occurring prior to rotation of back wheel 34 around axis 47, during folding of the scooter. The scope of the present invention includes having both rotations occur simultaneously, at least in part, or in any suitable sequence.

Figure 2F:
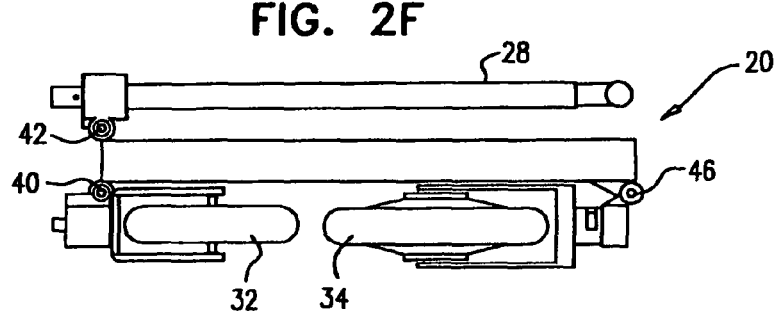
Figure 2G:
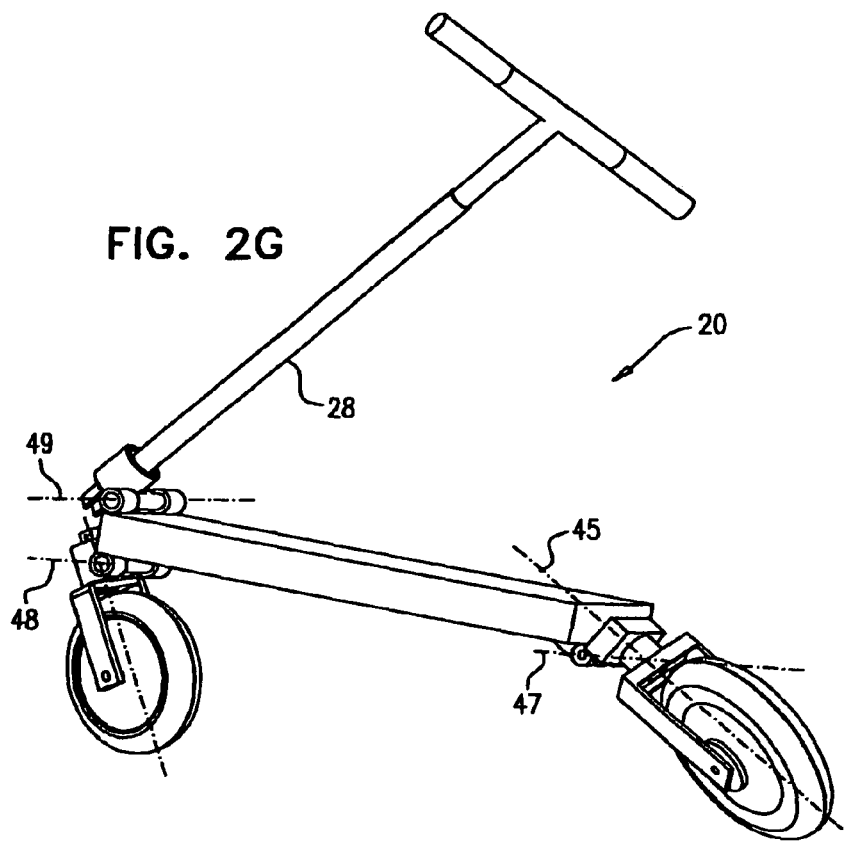

Reference is made to front wheel 32, as it is illustrated in FIGS. 2B-G, in accordance with some applications of the present invention. As described hereinabove, the hub of front wheel 32 is coupled to front end 50 of footboard 22 via first front hinge 40. During folding of scooter 20, front wheel 32 is turned to the left or right (e.g., to 90-degrees left or 90-degrees right), using the normal steering functionality of the scooter as shown in FIG. 2B. Front hinge 40 then facilitates rotation of front wheel 32 around axis 48 toward lower face 56 of footboard 22, as shown in FIGS. 2C-D and 2G. Rotation of front wheel 32 around axis 48 continues until the wheel reaches a position in which a left or right face of the front wheel faces one of the faces of footboard 22 (e.g., lower face 56), as shown in FIG. 2E-F.

Reference is made to steering bar 28 as it is illustrated in FIGS. 2A-G, in accordance with some applications of the present invention. As described hereinabove, scooter 20 typically comprises steering bar 28, coupled to front end 50 of footboard 22 and allows the user to steer the scooter. (As appropriate, other steering mechanisms may be used instead.) Typically, steering bar 28 is telescopically collapsible and is coupled to footboard 22 via second front hinge 42. During the transition of the scooter to the folded state, the steering bar is made to telescopically collapse as shown in FIGS. 2A-B. In the collapsed state, second front hinge 42 facilitates rotation of steering bar 28 around axis 49, as illustrated in FIGS. 2C-D and 2G. Rotation of steering bar 28 is facilitated by releasing a locking mechanism in hinge 42 that secures steering bar 28 in place when the scooter is in the unfolded, operative state. In addition, a locking mechanism that couples the steering bar to the hub of front wheel 32 is released, thus uncoupling steering bar 28 and front wheel 32. Rotation of steering bar 28 around axis 49 continues until steering bar 28 reaches a position in which it lies generally parallel to footboard 22. The steering bar is typically collapsible to a length that is generally similar to the length of footboard 22. Alternatively, steering bar 28 can be rotated around second front hinge 42 while the steering bar is in an uncollapsed, full length state, until steering bar 28 reaches a position in which it lies generally parallel to footboard 22. Once parallel to footboard 22, steering bar 28 can be telescopically collapsed. Typically, handle bar 30, which is coupled to steering bar 28, comprises a short handle bar extending from left to right. When the scooter is in the folded state with steering bar 28 lying parallel to footboard 22, handle bar 30 is generally within the width of footboard 22.

Alternatively, during folding of the scooter, the horizontal handle bar 30 may be uncoupled from steering bar 28 so as not to be perpendicular to steering bar 28, in accordance with techniques known in the art.

In some applications of the present invention, the scooter comprises a seat for accommodating the user in a sitting position. In such an application, the feet of the user rest upon the footboard. During the transition of the scooter from the operative state into the folded state, the seat is detached from the scooter and removed. Alternatively, the seat can be detached and coupled to the footboard via any suitable coupling mechanism.

Reference is made to FIG. 1. In some applications of the present invention, the scooter comprises an electric scooter that comprises an electric hub motor 80 built directly into the back wheel of the scooter. In such applications, the footboard typically holds one or more batteries 84 to power the electric motor and driving circuitry 85 which transmits the power to the hub motor. It is noted that use of hub motor 80 in back wheel 34 (rather than a chain drive system based on a footboard-mounted motor) facilitates the folding of the back wheel into the collapsed state, as described hereinabove.

Reference is still made to FIG. 1. For some applications footboard 22 comprises an extruded aluminum footboard. For such applications, footboard 22 is extruded such that during the extrusion process, footboard 22 is shaped to define a hollow cavity. Typically, battery 84 and/or driving circuitry 85 are disposed within the hollow cavity provided by the extrusion process.

Figure 3A:
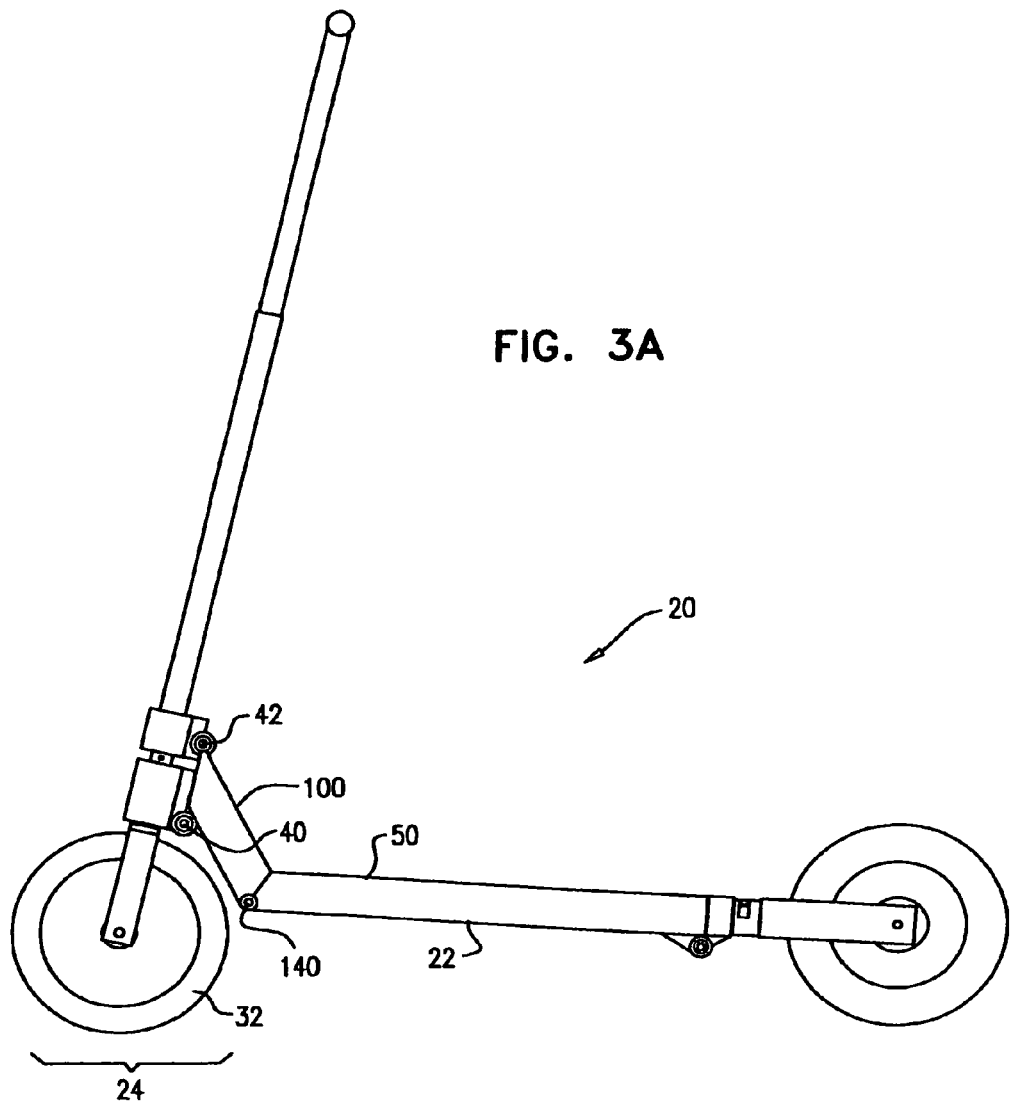
FIGS. 3A-L are schematic illustrations of the transition of the scooter from an unfolded, operative state into a folded state, in accordance with some applications of the present invention.

Reference is made to FIGS. 3A-3L, which are schematic illustrations of scooter 20, in accordance with another application of the present invention. In some applications of the present invention, front portion 24 of scooter 20 further comprises a connecting bar 100 and typically at least three front hinges. As shown in FIG. 3A, connecting bar 100 connects front end 50 of footboard 22 to the lower end of steering bar 28 and the hub of front wheel 32. First front hinge 40 couples connecting bar 100 to the hub of front wheel 32, and second front hinge 42 couples connecting bar 100 to the lower end of steering bar 28. A third front hinge 140 couples connecting bar 100 to front end 50 of footboard 22. Hinge 140 typically comprises a releasable locking mechanism in order to secure connecting bar 100 in place when the scooter is in an unfolded, operative state.

Figure 3B:
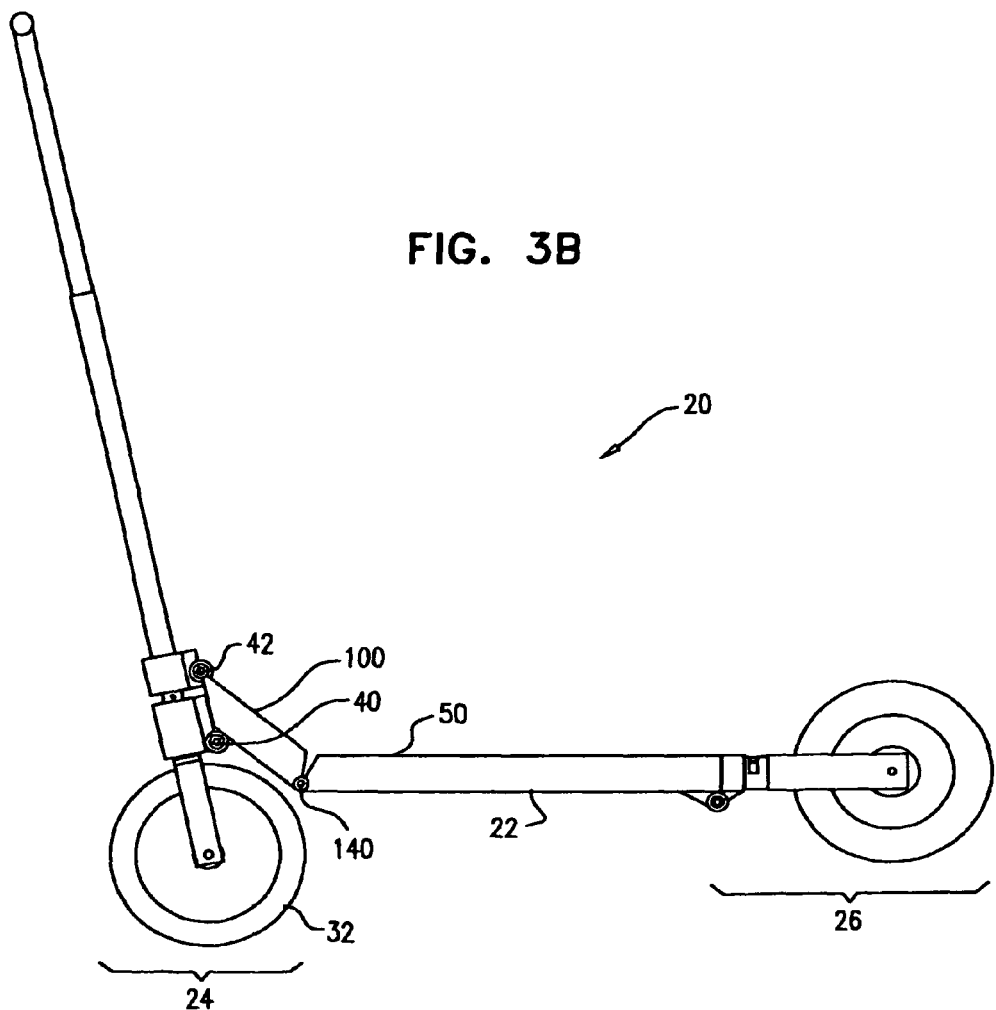
Figure 3C:
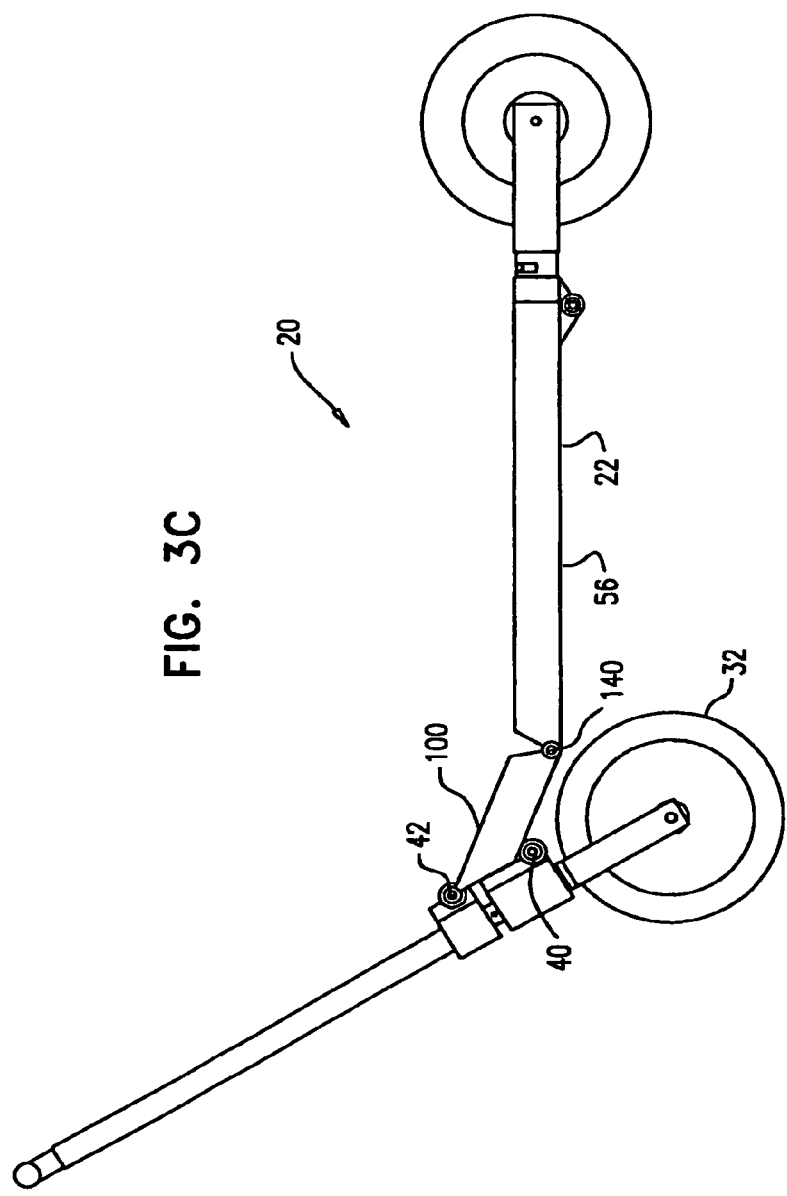
Figure 3D:
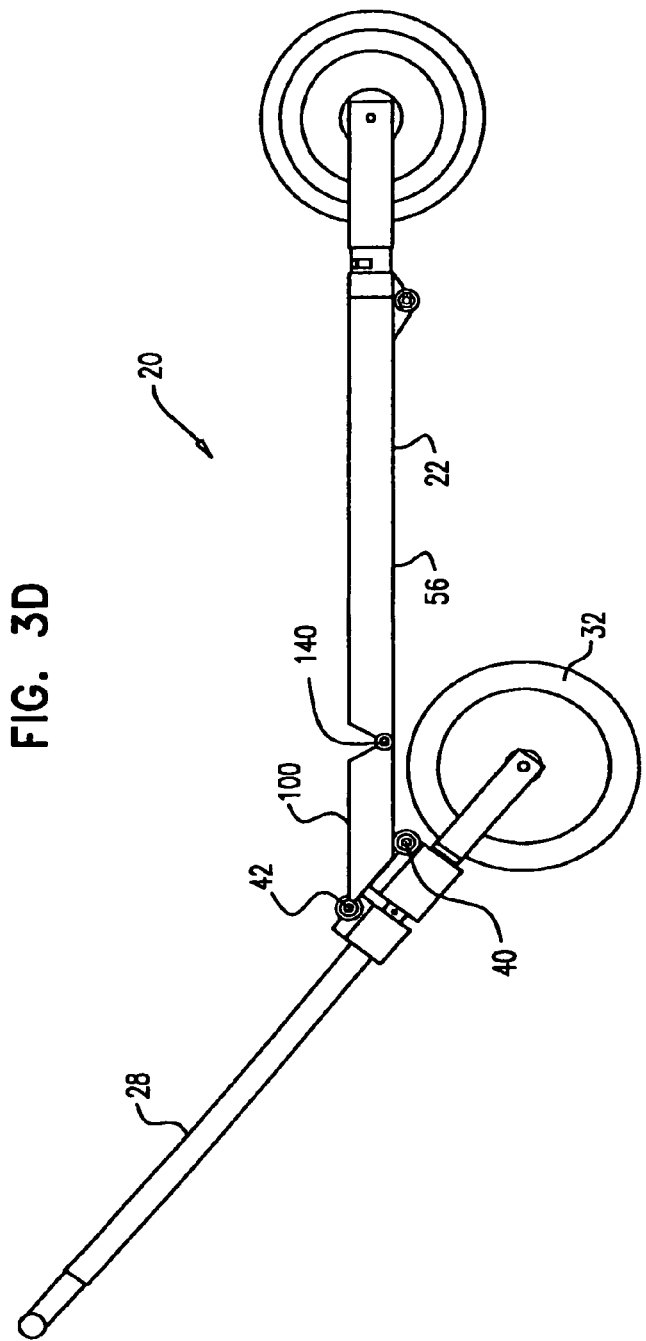
Figure 3E:
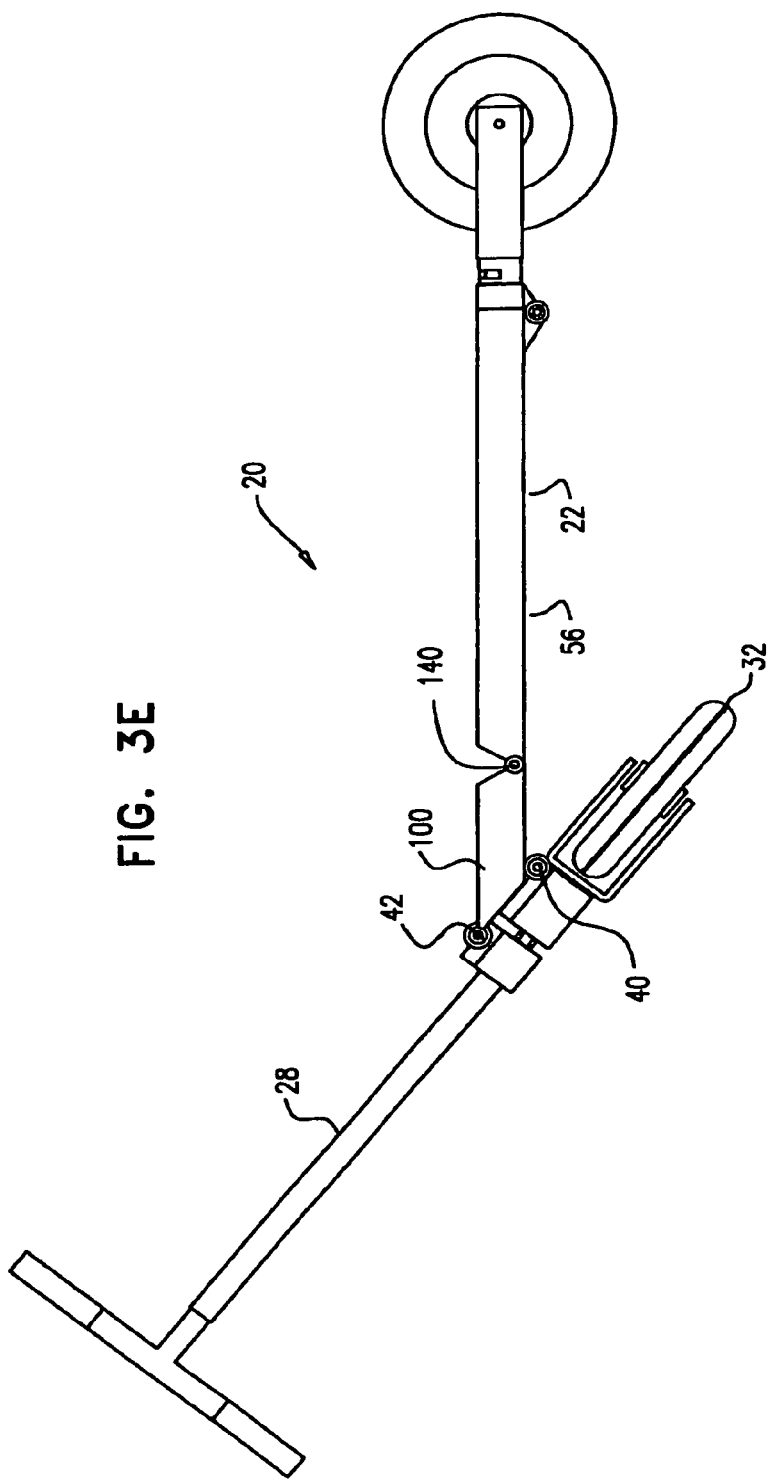
Figure 3F:
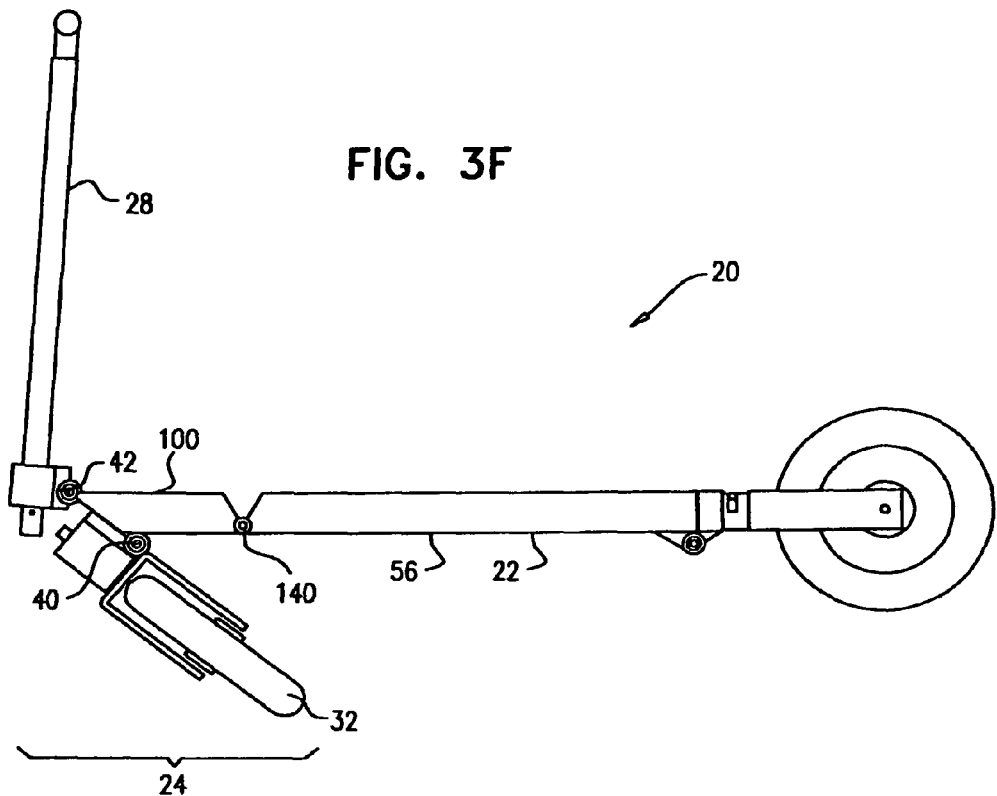
Figure 3G:
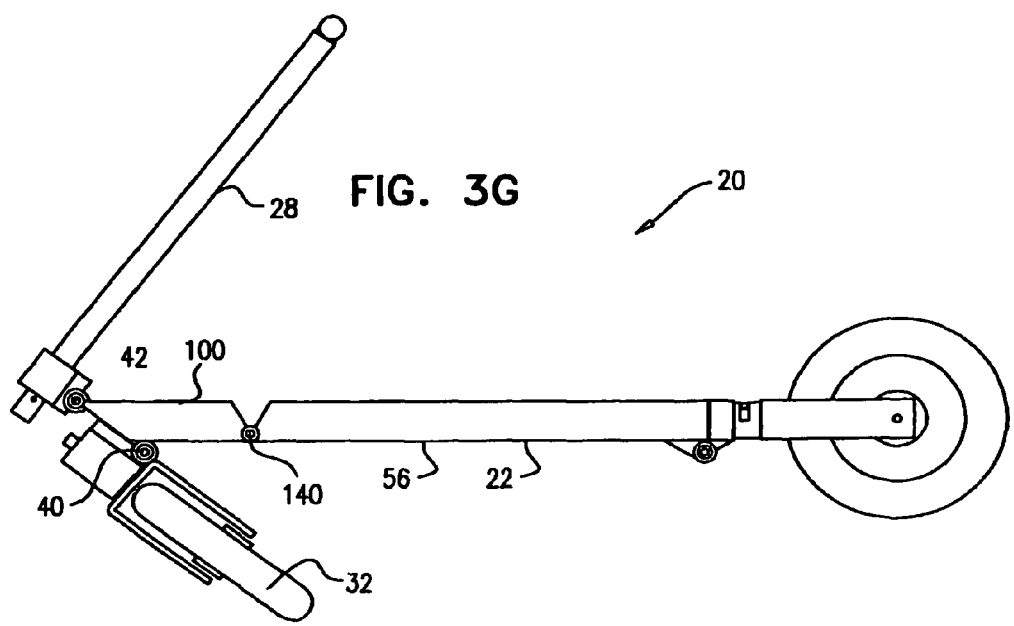
Figure 3H:
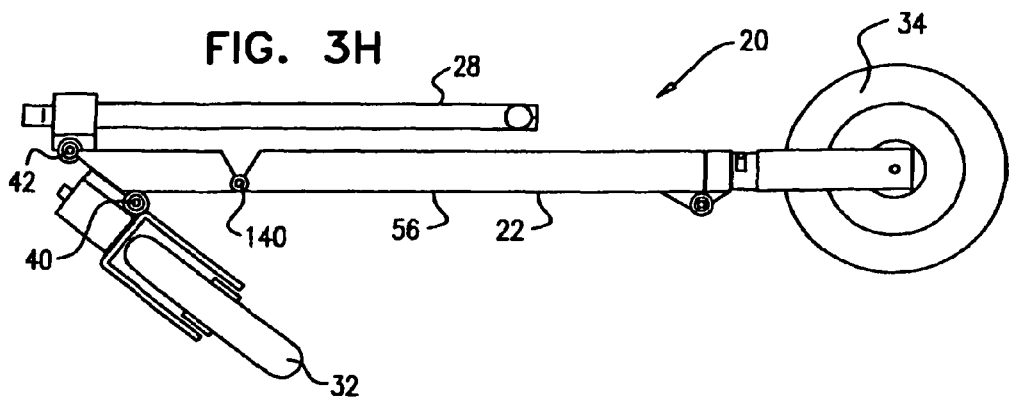

FIGS. 3B-I are schematic illustrations of the transition of front portion 24 of scooter 20 from an unfolded, operative state into a folded state, in accordance with some applications of the present invention. During folding of scooter 20, the locking mechanism of third hinge 140 is released and connecting bar 100 is lowered until it is coplanar with footboard 22 as shown in FIGS. 3B-D. As a result of lowering connecting bar 100, steering bar 28 (which is coupled to the connecting bar via second front hinge 42) is moved forward, away from the footboard. In this state, front wheel 32, which is coupled via the hub to the lower end of steering bar 28 and to connecting bar 100 via hinge 40, is brought into proximity with lower face 56 of footboard 22. Typically, the lower end of steering bar 28 is coupled to the hub of front wheel 32 via a locking mechanism. During the folding of front portion 24 of the scooter, this locking mechanism is released and steering bar 28 is separated from front wheel 32 while remaining coupled to connecting bar 100 via second front hinge 42, as shown in FIG. 3F. Steering bar 28 can then be rotated around second front hinge 42, until it reaches a position in which it lies generally parallel to footboard 22, as shown in FIGS. 3G-H.

Figure 3I:
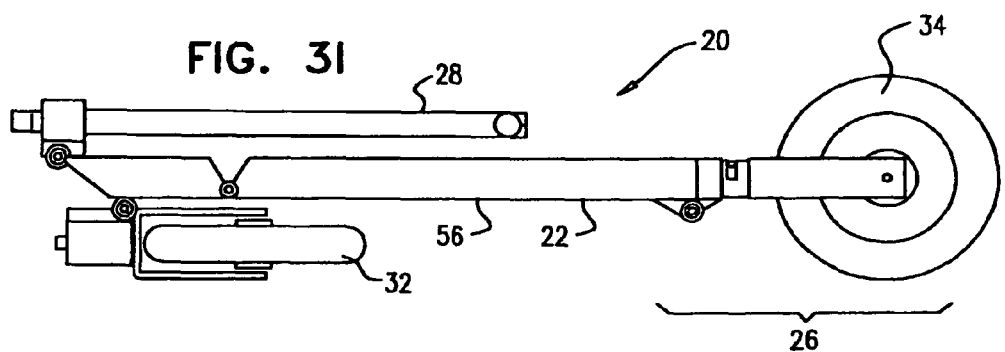
Figure 3J:
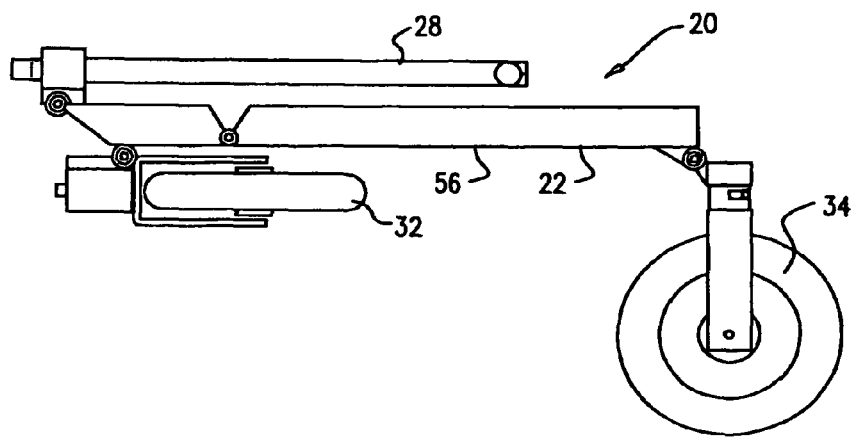
Figure 3K:
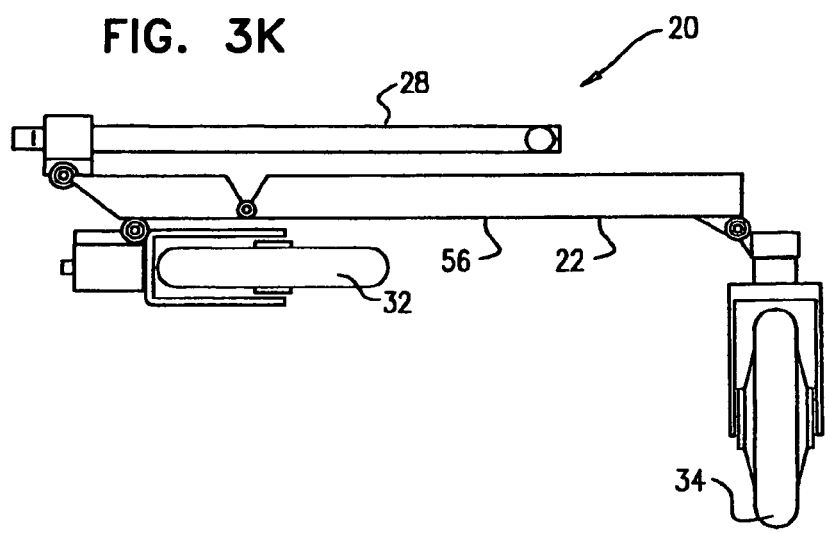
Figure 3L:
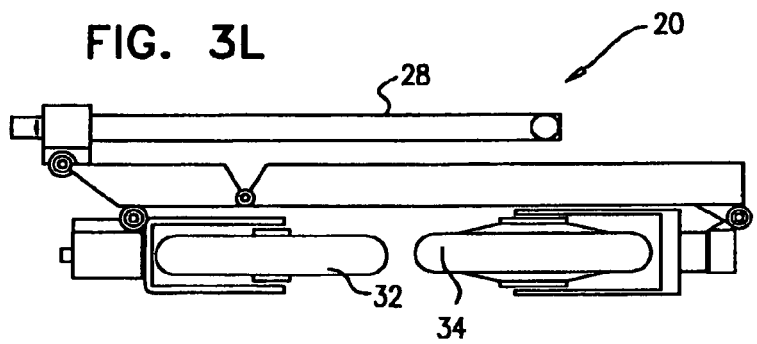

Reference is made to FIG. 3E. As described hereinabove, the hub of front wheel 32 is coupled to the lower end of steering bar 28. Following the lowering of connecting bar 100, and the subsequent shifting of steering bar 28, front wheel 32 is turned to the left or right (e.g., to 90-degrees left or 90-degrees right), using the normally steering functionality of the scooter, as shown in FIG. 3E. Front hinge 40 then facilitates rotation of front wheel 32 towards lower face 56 of footboard 22. Rotation of front wheel 32 continues until the wheel reaches a position in which a left or right face of the front wheel faces one of the faces of footboard 22 (e.g., lower face 56), as shown in FIG. 3I. Folding of back portion 26 of scooter 20 can then be carried out in the manner described herein above with reference to back wheel 34 and as illustrated in FIGS. 3J-L.

Figure 4:
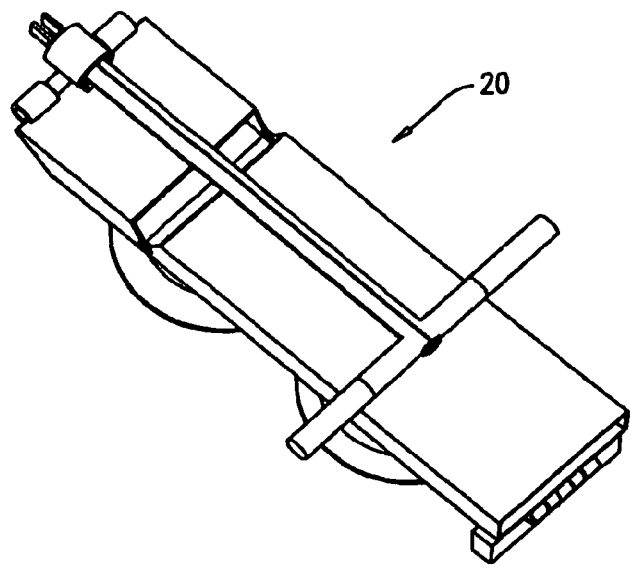
FIG. 4 is a schematic illustration of a top isometric view of the scooter in accordance with some applications of the present invention.

FIG. 4 is a schematic illustration of a top view of the scooter, in a folded state, in accordance with some applications of the present invention.

Figure 5:
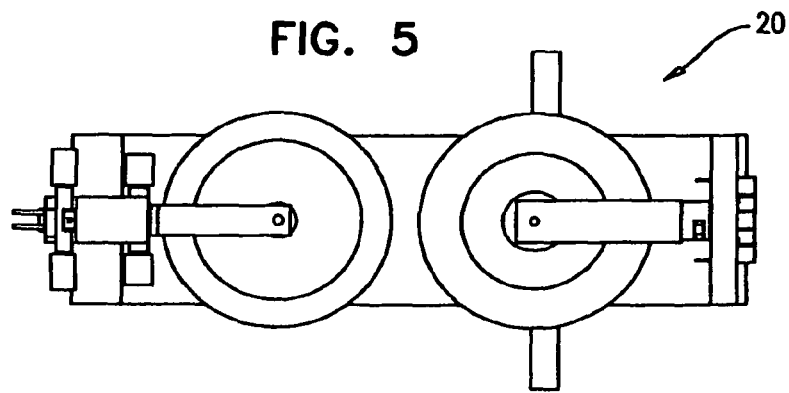
FIG. 5 is a schematic illustration of a bottom view of the scooter in accordance with some applications of the present invention.

FIG. 5 is a schematic illustration of a bottom view of the scooter, in a folded state, in accordance with some applications of the present invention.

Figure 6A:
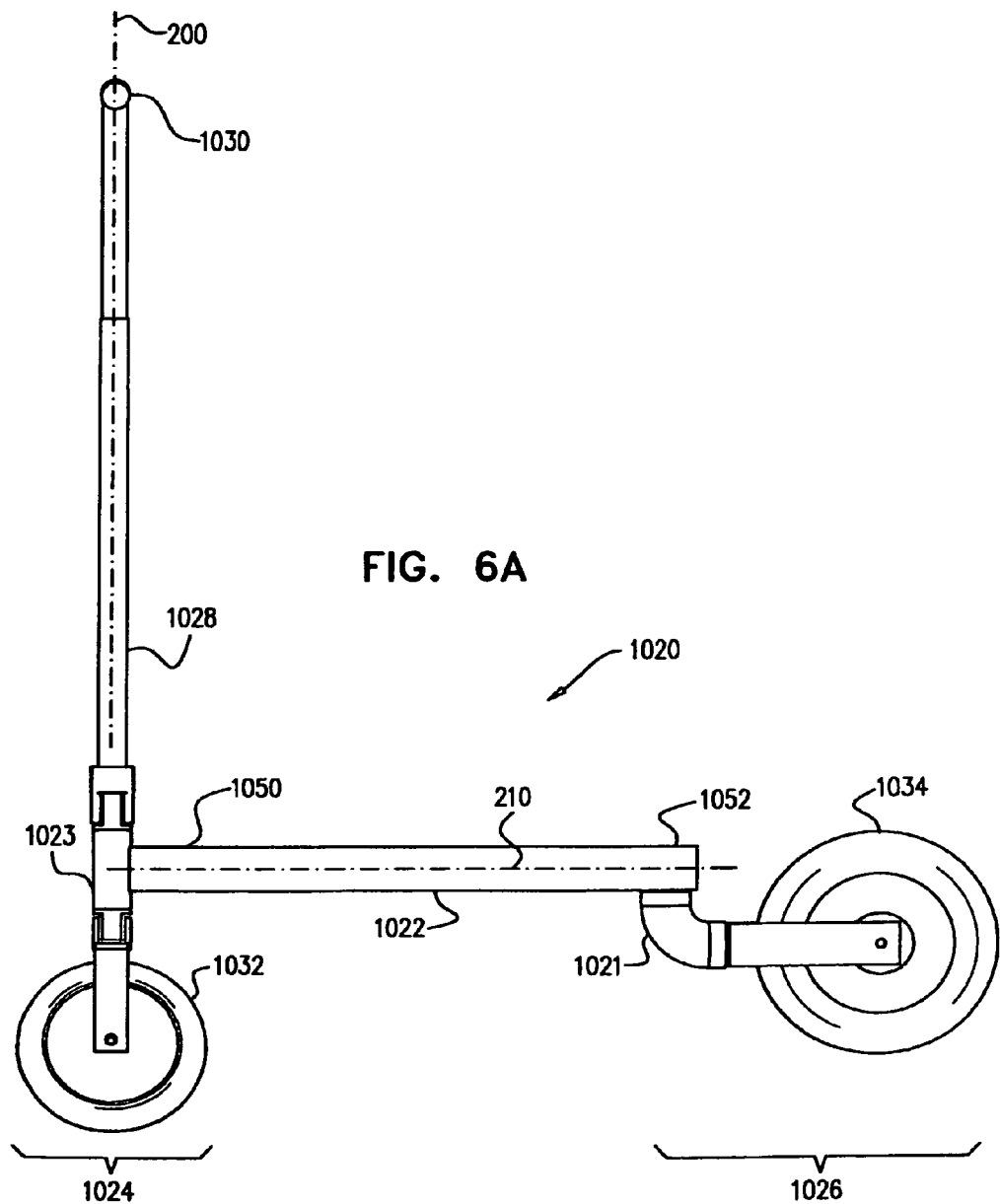

FIGS. 6A-I are schematic illustrations of a scooter 1020, in accordance with some applications of the present invention. FIG. 6A is a schematic illustration of a scooter 1020 in an operative unfolded state, in accordance with some applications of the present invention. It is to be noted that techniques described hereinabove with reference to scooter 20 apply to scooter 1020, except where otherwise indicated. Scooter 1020 comprises a footboard 1022 upon which a user stands. Footboard 1022 connects a front portion 1024 of the scooter with a back portion 1026 of the scooter. Typically, a front end 1050 of scooter 1022 is coupled to front portion 1024 of the scooter and a back end 1052 of scooter 1022 is coupled to back portion 1026 of the scooter. The scooter has a central horizontal axis 210 extending from front end 1050 to back end 1052. Front portion 1024 of scooter 1020 comprises a steering bar 1028, a handle bar 1030, a front wheel 1032 and typically a connecting element 1023 connecting the lower end of steering bar 1028 to a hub of front wheel 1032. As shown in FIG. 6A, connecting element 1023 is also coupled to a front end 1050 of footboard 1022. For some applications, connecting element 1023 comprises a hollow structure including a hinge. When scooter 1020 is in an unfolded operative state, the steering bar is typically coupled to connecting element 1023 via a locking mechanism that secures steering bar 1028 in place.

Back portion 1026 of scooter 1020 comprises a back wheel 1034. A hub of back wheel 1034 is coupled to back end 1052 of footboard 1022 by rotatable arm 1021.

Reference is made to FIGS. 6B-I which are schematic illustrations of the transition of scooter 1020 from an unfolded, operative state into a folded state, in accordance with some applications of the present invention.

Figure 6B:
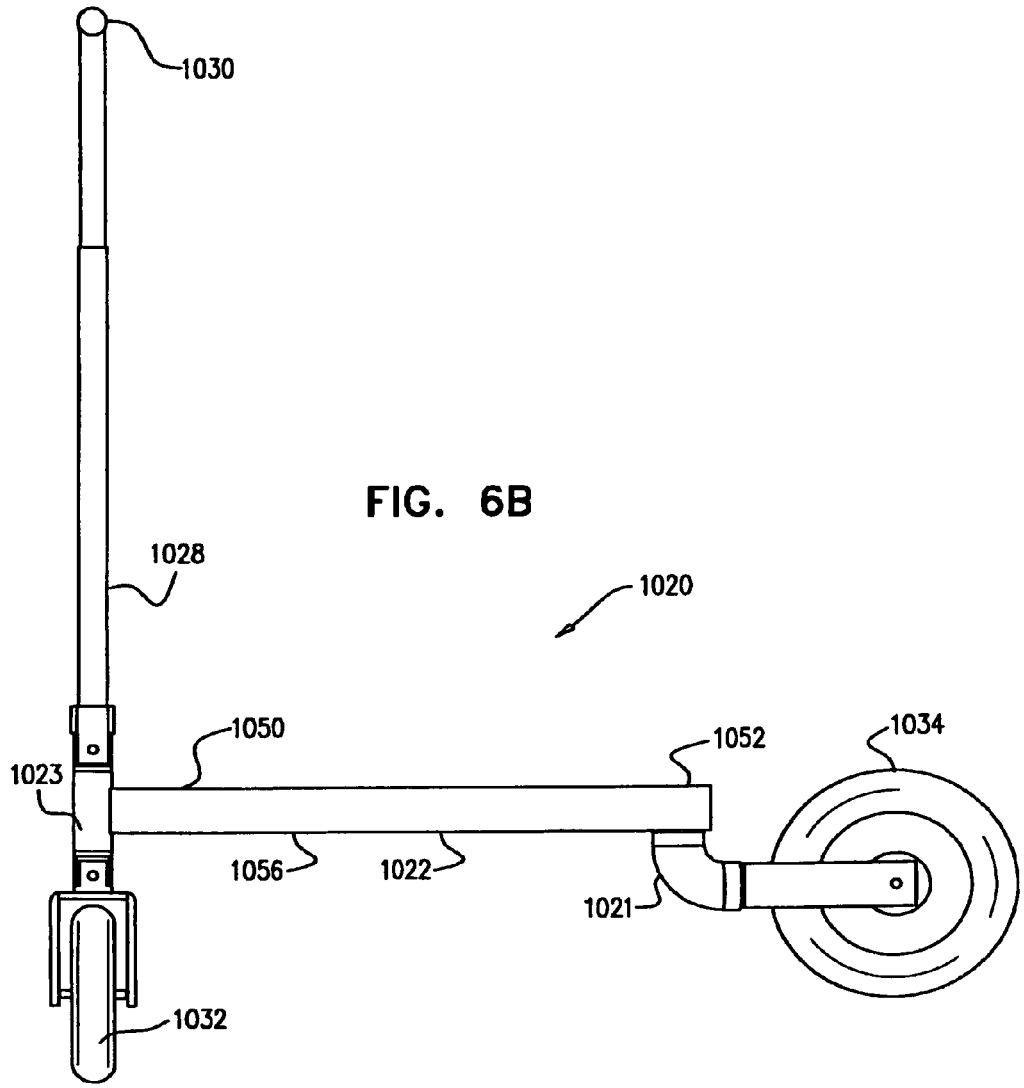
Figure 6C:
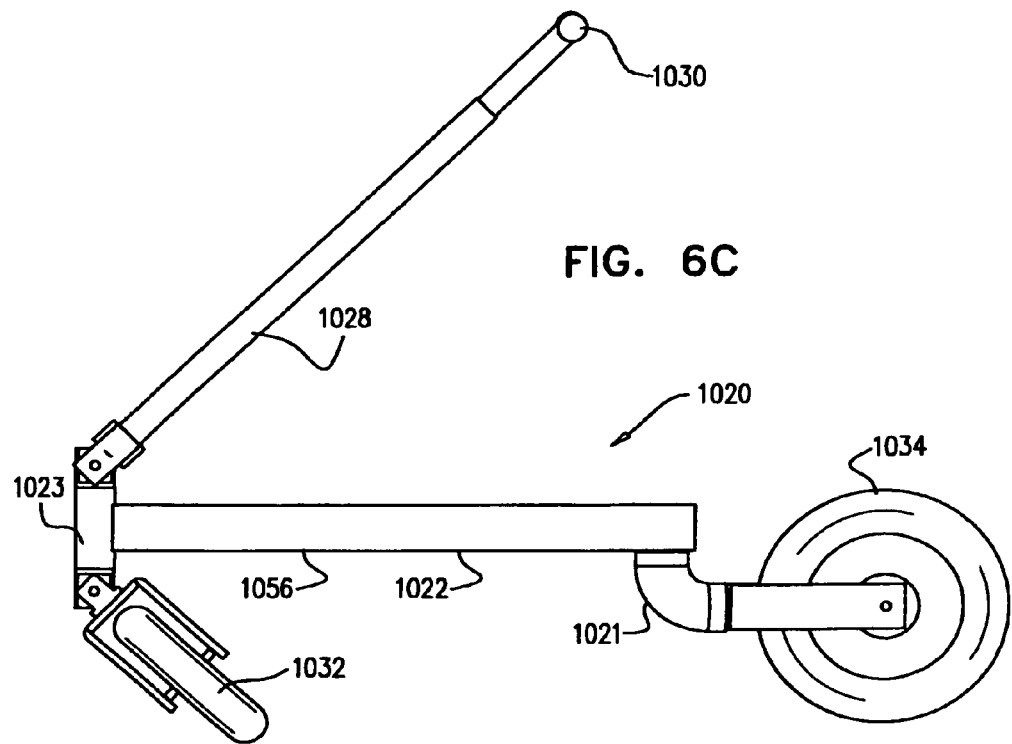
Figure 6D:
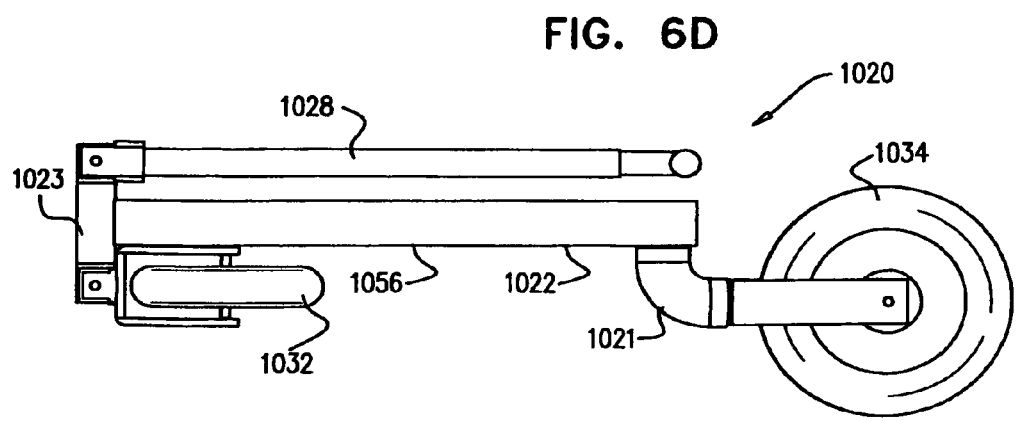

Reference is made to front wheel 1032, as it is illustrated in FIGS. 6B-D, in accordance with some applications of the present invention. As described hereinabove, the hub of front wheel 1032 is coupled to connecting element 1023 via a locking mechanism which locks wheel 1032 in place when the scooter is in the unfolded operative state. During folding of scooter 1020, front wheel 1032 is turned to the left or right (e.g., to 90-degrees left or 90-degrees right), using the normal steering functionality of the scooter as shown in FIG. 6B. The locking mechanism which locks wheel 1032 in place when the scooter is in an unfolded operative state is released, and front wheel 1032 is rotated around axis 1048 (FIG. 6I) toward lower face 1056 of footboard 1022, as shown in FIGS. 6C-D and 6I. Rotation of front wheel 32 around axis 1048 continues until the wheel reaches a position in which a left or right face of the front wheel faces one of the faces of footboard 1022 (e.g., lower face 1056), as shown in FIG. 6D.

Reference is made to steering bar 1028 as it is illustrated in FIGS. 6A-I, in accordance with some applications of the present invention. As described hereinabove, scooter 1020 typically comprises steering bar 1028, which allows the user to steer the scooter. (As appropriate, other steering mechanisms may be used instead.) Steering bar 1028 is typically coupled to connecting bar 1023 via a locking mechanism which typically couples steering bar 1028 to connecting element 1023 and locks steering bar 1028 in place when the scooter is in an unfolded position. During transition of scooter 1020 into a folded state, the locking mechanism is released, such that steering bar 1028 is uncoupled from connecting element 1023 and steering bar 1028 is made to rotate around axis 1049, as illustrated in FIGS. 6C-D and 6I. Rotation of steering bar 1028 around axis 1049 continues until steering bar 1028 reaches a position in which it lies generally parallel to footboard 1022. For some applications, steering bar 1028 is telescopically collapsible and during transition of the scooter to the folded state, the steering bar is made to telescopically collapse. The steering bar is typically collapsible to a length that is generally similar to the length of footboard 1022. Alternatively, steering bar 1028 can be rotated while the steering bar is in an uncollapsed, full length state, until steering bar 1028 reaches a position in which it lies generally parallel to footboard 1022. Once parallel to footboard 1022, steering bar 1028 can be telescopically collapsed. Typically, handle bar 1030, which is coupled to steering bar 1028, comprises a short handle bar extending from left to right. When the scooter is in the folded state with steering bar 1028 lying parallel to footboard 1022, handle bar 1030 is generally within the width of footboard 1022. Alternatively, during folding of the scooter, the horizontal handle bar 1030 may be uncoupled from steering bar 1028, so as not to be perpendicular to steering bar 1028, in accordance with techniques known in the art.

Reference is made to back wheel 1034 as shown in FIGS. 6E-I. As described hereinabove, the hub of back wheel 1034 is coupled to back end 1052 of footboard 1022 via rotatable arm 1021. Back wheel 1034 has a central longitudinal axis 1043 around which the back wheel rotates when the user rides the scooter. During folding of the scooter, back wheel 1034 is made to rotate around an axis 1070 (FIG. 6I) that is horizontal (or otherwise parallel) to a central horizontal axis 210 (shown in FIG. 6A) of footboard 1022. This rotation is shown in FIGS. 6E-I. Rotation of the back wheel around axis 1070 causes back wheel 1034 to be generally parallel to footboard 1022 as shown in FIGS. 6E-H.

Once back wheel 1034 has been rotated around axis 1070 to a position in which it is parallel to footboard 1022, rotatable arm 1021 facilitates further rotation of the back wheel, around a different axis 1080, as shown in FIGS. 6F-I. Typically, this different axis 1080 is perpendicular (or otherwise not parallel) to central longitudinal axis 1043 of the back wheel when scooter 1020 is in its unfolded operative state (as shown in FIG. 6I). Rotation of wheel 1034 around axis 1080 continues until the wheel reaches a position in which a face of the back wheel (e.g., a left face 1060 of wheel 1034), faces one of the faces of the footboard (e.g., lower face 1056) as shown in FIGS. 6G-H.

Figure 6E:
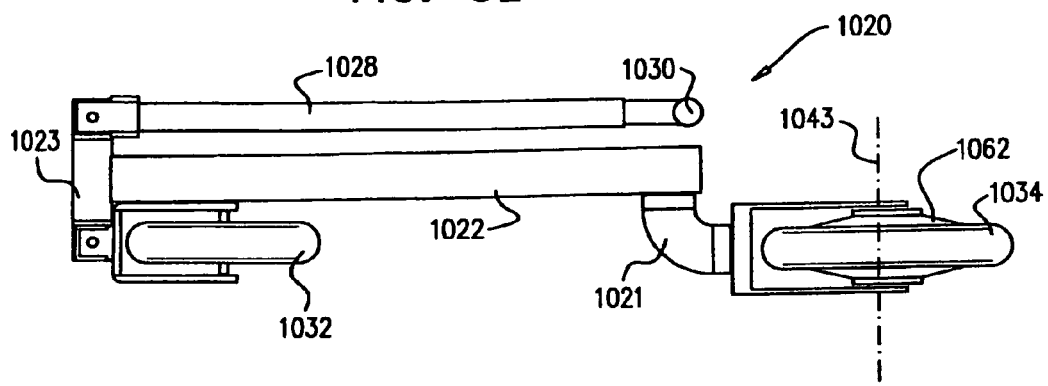
Figure 6F:
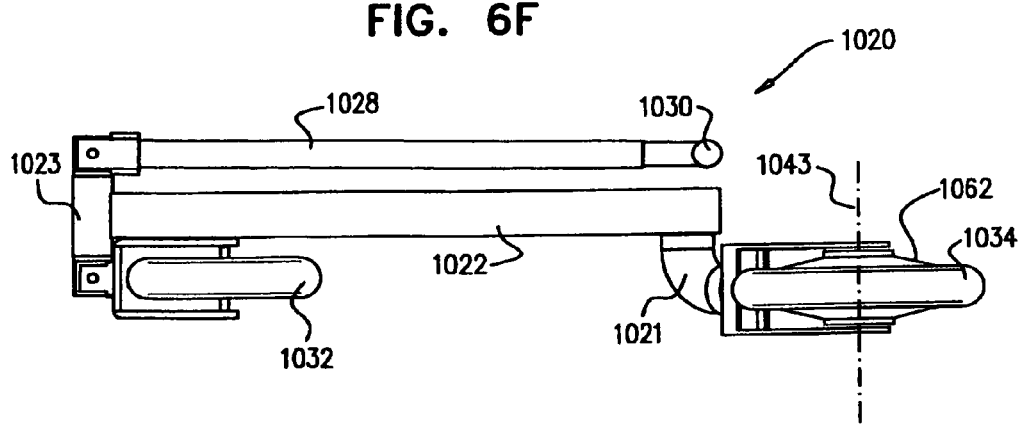
Figure 61:
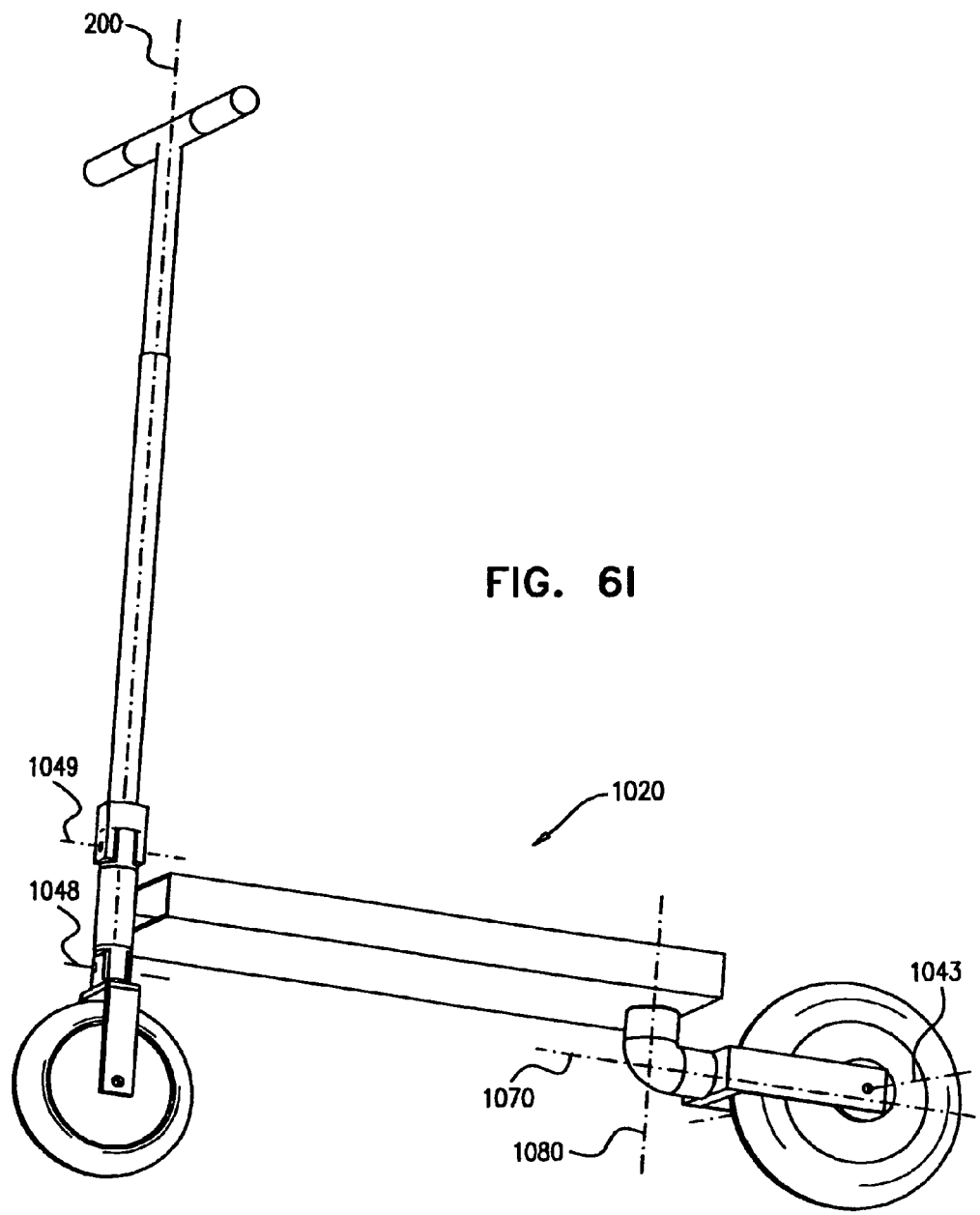

For clarity, FIGS. 6D-E show rotation of back wheel 1034 around axis 1070 occurring prior to rotation of back wheel 1034 around axis 1080, during folding of the scooter. The scope of the present invention includes having both rotations occur simultaneously, at least in part, or in any suitable sequence.

In general, except where inappropriate, sequences of steps shown in the figures or described herein may be performed out of sequence. Thus, for example, it is generally not important which wheel is folded or unfolded first, or whether this occurs prior to or following folding, unfolding, expanding, or collapsing of the steering bar. Sequences of steps as shown and described are, therefore, to be understood as being by way of illustration and not limitation.

It is to be understood that the present application describes a folding wheel mechanism for a scooter by way of illustration and not limitation, and that the scope of the present invention includes utilizing a folding wheel mechanism with any type of vehicle, mutatis mutandis.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A portable foldable scooter having a front portion and a back portion, the scooter comprising:
    a footboard having an upper face, a lower face, a front end at the front portion of the scooter, and a back end at the back portion of the scooter;
    a steering bar having an upper end and a lower end, the steering bar being coupled to the front end of the footboard;
    a handle bar coupled to the upper end of the steering bar;
    a front wheel coupled to the front portion of the scooter by a front wheel assembly which is also coupled to the steering bar so as to permit the scooter to be steered, said front wheel having a left side surface and a right side surface;
    a back wheel having an axis around which the back wheel rotates during riding of the scooter and coupled to the back portion of the scooter by a back wheel assembly; and
    a front hinge coupling the front wheel assembly to the front end of the footboard for allowing rotation of the front wheel, independent of its connection to the steering bar, to a position at which one of said left and right side surfaces of said front wheel is disposed directly opposite one of said upper and lower faces of said footboard in a face-to-face manner.

2. The scooter according to claim 1, wherein:
the back wheel comprises a hub motor.

3. The scooter according to claim 2, wherein:
the hub motor comprise's an electric hub motor.

4. The scooter according to claim 3, wherein:
the footboard comprises at least one battery for powering the electric hub motor.

5. The scooter according to claim 4, wherein:
the footboard comprises an extruded aluminum footboard defining a hollow cavity therein, wherein the at least one battery is disposed within the cavity.

6. The scooter according to claim 1, further comprising:
a first back hinge coupling the back wheel assembly to the back end of the footboard and allowing rotation of the back wheel assembly around an axis that is not parallel to the axis about which the back wheel rotates during riding of the scooter.

7. The scooter according to claim 6, wherein:
the first back hinge allows rotation of the back wheel around an axis that is perpendicular to the axis about which the back wheel rotates during riding of the scooter.

8. The scooter according to claim 6, further comprising:
a second back hinge coupling the back wheel to the back end of the footboard and allowing rotation of the back wheel to a position in which a face of the back wheel faces one of the faces of the footboard.

9. The scooter according to claim 6, wherein:
said first back hinge comprises a locking mechanism.

10. The scooter according to claim 1, further comprising:
a connecting bar interconnecting the front end portion of the footboard to the steering bar.

11. The scooter according to claim 10, further comprising:
a hinge mechanism interconnecting the connecting bar to the steering bar.

12. A portable foldable scooter having a front portion and a back portion, the scooter comprising:
    a footboard having an upper face, a lower face, a front end at the front portion of the scooter, and a back end at the back portion of the scooter;
    a steerable front wheel, coupled to the front portion of the scooter by a front wheel assembly, so as to permit the scooter to be steered, said front wheel having a left side surface and a right side surface;
    a back wheel coupled to the back portion of the scooter by a back wheel assembly; and
    a front hinge coupling the front wheel assembly to the front end of the footboard for allowing rotation of the front wheel, independent of any steering movement, to a position at which one of said left and right side surfaces of said front wheel is disposed directly opposite one of said upper and lower faces of said footboard in a face-to-face manner.

13. The scooter according to claim 12, wherein:
in the folded state of the scooter, a face of the back wheel is also disposed opposite one of the faces of the footboard.

14. A portable foldable scooter having a front portion and a back portion, the scooter comprising:
    a footboard having an upper face, a lower face, a front end at the front portion of the scooter, and a back end at the back portion of the scooter, the footboard having a central horizontal axis extending from the front end to the back end;
    a steering bar having an upper end and a lower end, the steering bar coupled to the front end of the footboard;
    a handle bar coupled to the upper end of the steering bar;
    a front wheel coupled to the front portion of the scooter by a front wheel assembly which is also coupled to the steering bar so as to permit the scooter to be steered, said front wheel having a left side surface and a right side surface; and
    a back wheel having an axis around which the back wheel rotates during riding of the scooter and coupled to the back portion of the scooter by a back wheel assembly;
    wherein during folding of the scooter, the front wheel is able to rotate around an axis that is perpendicular to the central horizontal axis of the footboard, independent of any steering movement of the front wheel, such that one of said left and right side surfaces of said front wheel is disposed directly opposite one of said upper and lower faces of said footboard in a face-to-face manner.

15. The scooter according to claim 14, further comprising:
at least one connecting element coupling the back wheel to the back end of the footboard and allowing rotation of the back wheel to a position at which a face of the back wheel is disposed opposite one of the faces of the footboard.

16. The scooter according to claim 15, further comprising:
a rotatable arm assembly connecting said back wheel assembly to said back end portion of said footboard so as to permit said back wheel to rotate around an axis that is not parallel to the axis of the back wheel about which the back wheel rotates during riding of the scooter.

17. The scooter according to claim 16, wherein:
the rotatable arm is structured so as to rotate the back wheel around an axis that is perpendicular to the axis of the back wheel about which the back wheel rotates during riding of the scooter.

18. The scooter according to claim 16, wherein:
said rotatable arm assembly enables said back wheel to be rotated around two different axes which are both perpendicular to the axis around which said back wheel rotates during riding of the scooter.

19. The scooter according to claim 14, further comprising:
a connecting bar interconnecting the front end portion of the footboard to the steering bar.

20. The scooter according to claim 19, further comprising:
a hinge mechanism interconnecting the connecting bar to the steering bar.

* * * * *